United States Patent
Li et al.

(10) Patent No.: US 11,038,679 B2
(45) Date of Patent: *Jun. 15, 2021

(54) SECURE MULTI-PARTY COMPUTATION METHOD AND APPARATUS, AND ELECTRONIC DEVICE

(71) Applicant: ADVANCED NEW TECHNOLOGIES CO., LTD., Grand Cayman (KY)

(72) Inventors: Lichun Li, Hangzhou (CN); Shan Yin, Hangzhou (CN); Huazhong Wang, Hangzhou (CN); Wenzhen Lin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,379

(22) Filed: Oct. 31, 2020

(65) Prior Publication Data

US 2021/0051007 A1    Feb. 18, 2021

Related U.S. Application Data

(63) Continuation of application No. PCT/CN2019/092266, filed on Jun. 21, 2019.

(30) Foreign Application Priority Data

Aug. 14, 2018 (CN) .......................... 201810924482.8

(51) Int. Cl.
   *H04L 29/06* (2006.01)
   *H04L 9/08* (2006.01)
   *G06F 7/58* (2006.01)

(52) U.S. Cl.
   CPC ............. *H04L 9/0869* (2013.01); *G06F 7/582* (2013.01); *H04L 2209/38* (2013.01); *H04L 2209/46* (2013.01)

(58) Field of Classification Search
   CPC ............... H04L 9/0869; H04L 2209/38; H04L 2209/46; G06F 7/582
   (Continued)

(56) References Cited

U.S. PATENT DOCUMENTS 8,056,124 B2   11/2011   Bassett et al.
8,744,077 B2   6/2014    Camenisch et al.
(Continued)

FOREIGN PATENT DOCUMENTS

CN   103064931 A   4/2013
CN   103888262 A   6/2014
(Continued)

OTHER PUBLICATIONS

First Search for Chinese Application No. 201810924482.8 dated Jan. 16, 2020.
(Continued)

*Primary Examiner* — Evans Desrosiers

(57) ABSTRACT

Embodiments of a multi-party secure computation method applicable to any one computing node deployed in a distributed network are provided. A plurality of computing nodes are deployed in the distributed network, the plurality of computing nodes jointly participate in a secure multi-party computation based on respectively held private data, and the computing node that performs the method is connected to a trusted random source. The method includes: obtaining a trusted random number from the trusted random source; performing an operation on the held private data based on the obtained trusted random number to obtain an operation result; and transmitting a computing parameter
(Continued)

comprising at least the trusted random number to other computing nodes participating in secure multi-party computation, so that the other computing nodes perform the secure multi-party computation based on collected computing parameters transmitted by the computing nodes participating in the secure multi-party computation.

15 Claims, 2 Drawing Sheets

(58) Field of Classification Search
USPC .......................................................... 380/44
See application file for complete search history.

(56) References Cited

U.S. PATENT DOCUMENTS

| | | | |
|---|---|---|---|
| 9,569,771 B2 | 2/2017 | Lesavich et al. | |
| 10,382,205 B1 | 8/2019 | Ko | |
| 10,404,471 B1 | 9/2019 | Griffin et al. | |
| 10,579,825 B2 | 3/2020 | Miller | |
| 10,776,696 B2 | 9/2020 | Katz et al. | |
| 10,805,393 B2 | 10/2020 | Grefen et al. | |
| 2003/0095663 A1 | 5/2003 | Nelson et al. | |
| 2010/0121896 A1* | 5/2010 | Oram | H04L 9/0662 708/250 |
| 2012/0210128 A1 | 8/2012 | Hayashi et al. | |
| 2013/0251145 A1 | 9/2013 | Lowans et al. | |
| 2013/0275752 A1 | 10/2013 | Zhang et al. | |
| 2017/0250972 A1* | 8/2017 | Ronda | H04L 9/3236 |
| 2017/0352027 A1 | 12/2017 | Zhang et al. | |
| 2018/0049043 A1 | 2/2018 | Hoffberg | |
| 2018/0137512 A1 | 5/2018 | Georgiadis et al. | |
| 2019/0044703 A1 | 2/2019 | Smith | |
| 2019/0164153 A1 | 5/2019 | Agrawal et al. | |
| 2019/0243572 A1 | 8/2019 | Kursun | |
| 2019/0386969 A1 | 12/2019 | Verzun et al. | |
| 2020/0007311 A1 | 1/2020 | Oberhofer et al. | |
| 2020/0186528 A1* | 6/2020 | Fan | H04L 9/00 |
| 2020/0211105 A1 | 7/2020 | Du | |

FOREIGN PATENT DOCUMENTS

| | | |
|---|---|---|
| CN | 106255038 A | 12/2016 |
| CN | 106506156 A | 3/2017 |
| CN | 108322306 A | 7/2018 |
| CN | 108364223 A | 8/2018 |
| CN | 109101822 A | 12/2018 |
| CN | 109255247 A | 1/2019 |
| TW | 201244438 A | 11/2012 |

OTHER PUBLICATIONS

First Office Action for Chinese Application No. 201810924482.8 dated Feb. 3, 2020.
Supplementary Search for Chinese Application No. 201810924482.8 dated Apr. 7, 2020.
Second Office Action for Chinese Application No. 201810924482.8 dated Apr. 15, 2020.
Search Report for Taiwanese Application No. 108120454 dated May 26, 2020.
Written Opinion of the International Searching Authority and International Search Report for PCT Application No. PCT/CN2019/092266 dated Sep. 19, 2020.
Anonymity, "Random Number Prediction in Ethereum Smart Contract," https://www.freebuf.com/vuls/179173.html, Jul. 30, 2018.
Anonymity, "Cloud Data Auditing Techniques with a Focus on Privacy and Security," https://www.infoq.cn/article/cloud-data-auditing, Sep. 5, 2017.
Tang, Jianhong et al., "Research on Solving Sales Problem of Secure Multi-Party Computation," Microcomputer & Its Application, vol. 31, No. 20, Oct. 25, 2012.

* cited by examiner

US 11,038,679 B2

SECURE MULTI-PARTY COMPUTATION METHOD AND APPARATUS, AND ELECTRONIC DEVICE

CROSS-REFERENCE TO RELATED APPLICATIONS

This application is a continuation application of International Patent Application No. PCT/CN2019/092266, filed on Jun. 21, 2019, which is based on and claims priority of the Chinese Patent Application No.: 201810924482.8, filed on Aug. 14, 2018. The above-referenced applications are incorporated herein by reference in their entirety.

TECHNICAL FIELD

One or more embodiments of this specification relate to the field of distributed computing, and in particular, to a secure multi-party computation method and apparatus, and an electronic device.

BACKGROUND

Secure multi-party computation is a cryptography technology. Multiple parties participating in the secure computation may, by executing a secure multi-party computation algorithm, jointly perform the secure computation based on respectively held private data to obtain a computation result without disclosing each party's private data to other parties.

Although a secure multi-party computation algorithm is designed to protect the privacy of each party's private data, an erroneous or malicious algorithm implementation may cause a breach on the private data. In an ideal scenario, the parties may each develop its own secure multi-party computation software and use it to participate in the secure multi-party computation. However, in actual applications, secure multi-party computation software used by the parties may usually be provided by a same provider, and therefore it is imperative for the provider to show that the secure multi-party computation software it provides is trustworthy and there is no risk of data breach.

SUMMARY

This specification provides a secure multi-party computation method, applicable to any one computing node deployed in a distributed network, a plurality of computing nodes being deployed in the distributed network, and the plurality of computing nodes jointly participating in a secure multi-party computation based on respectively held private data, the computing node being connected to a trusted random source, the method including: obtaining a trusted random number from the trusted random source; performing an operation on the held private data based on the obtained trusted random number to obtain an operation result; and transmitting at least the trusted random number as a computing parameter to other computing nodes participating in the secure multi-party computation for the other computing nodes to perform the secure multi-party computation based on collected computing parameters transmitted by the computing nodes participating in the secure multi-party computation.

Optionally, the method further includes: creating an audit log corresponding to the trusted random number transmitted by the computing node to the other computing nodes, the audit log recording description information related to the trusted random number.

Optionally, the method further includes: collecting computing parameters transmitted by the other computing nodes participating in the secure multi-party computation, the computing parameters at least including random numbers transmitted by the other computing nodes; performing the secure multi-party computation based on the collected computing parameters; and creating an audit log corresponding to the random numbers transmitted by the other computing nodes, the audit log including description information related to the random numbers.

Optionally, the method further includes: performing, based on the audit log, a privacy audit on the random number transmitted as a computing parameter by the computing node participating in the secure multi-party computation, to determine whether the random number transmitted as a computing parameter by the computing node is at a risk of privacy leakage; or transmitting the audit log to a third-party audit node for the audit node to perform a privacy audit on the random number transmitted as a computing parameter by the computing node participating in the secure multi-party computation, to determine whether the random number transmitted as a computing parameter by the computing node is at a risk of privacy leakage.

Optionally, the description information related to the trusted random number includes a random number generation rule corresponding to the trusted random number; and the performing, based on the audit log, a privacy audit on the random number transmitted as a computing parameter by the computing node participating in the secure multi-party computation, to determine whether the random number transmitted as a computing parameter by the computing node is at a risk of privacy leakage includes: verifying, based on the random number generation rule that is recorded in the audit log and corresponds to the random number transmitted by the computing node participating in the secure multi-party computation, whether the random number matches the trusted random number from the trusted random source; and if it does, determining that the random number transmitted as the computing parameter by the computing node is at the risk of privacy leakage; or if it does not, determining that the random number transmitted as the computing parameter by the computing node is not at the risk of privacy leakage.

Optionally, the obtaining a trusted random number from the trusted random source includes any one of the following: obtaining a random number generated by the trusted random source as the trusted random number; obtaining a random number generated by the trusted random source, and using a result obtained by further performing an operation on the random number generated by the trusted random source and a random number generated by the computing node as the trusted random number; obtaining a random number generated by the trusted random source, and using a random number computed by inputting the random number generated by the trusted random source into a key generation function as the trusted random number; and obtaining a random number generated by the trusted random source, and using a result obtained by further performing an operation on a random number computed by inputting the random number generated by the trusted random source into a key generation function and a random number generated by the computing node as the trusted random number.

This specification further provides a secure multi-party computation apparatus, applicable to any one computing node deployed in a distributed network, a plurality of computing nodes being deployed in the distributed network, and the plurality of computing nodes jointly participating in a secure multi-party computation based on respectively held private data, the computing node being connected to a trusted random source, the apparatus including: an obtaining module, configured to obtain a trusted random number from the trusted random source; an operation module, configured to perform an operation on the held private data based on the obtained trusted random number to obtain an operation result; and a transmission module, configured to transmit at least the trusted random number as a computing parameter to other computing nodes participating in the secure multi-party computation for the other computing nodes to perform the secure multi-party computation based on collected computing parameters transmitted by the computing nodes participating in the secure multi-party computation.

Optionally, the apparatus further includes: a creation module, configured to create an audit log corresponding to the trusted random number transmitted by the computing node to the other computing nodes, the audit log recording description information related to the trusted random number.

Optionally, the apparatus further includes: a collection module, configured to collect computing parameters transmitted by the other computing nodes participating in the secure multi-party computation, the computing parameters at least including random numbers transmitted by the other computing nodes; perform the secure multi-party computation based on the collected computing parameters; and create an audit log corresponding to the random numbers transmitted by the other computing nodes, the audit log including description information related to the random numbers.

Optionally, the apparatus further includes: an audit module, configured to perform, based on the audit log, a privacy audit on the random number transmitted as a computing parameter by the computing node participating in the secure multi-party computation, to determine whether the random number transmitted as a computing parameter by the computing node is at a risk of privacy leakage; or transmit the audit log to a third-party audit node for the audit node to perform a privacy audit on the random number transmitted as a computing parameter by the computing node participating in the secure multi-party computation, to determine whether the random number transmitted as a computing parameter by the computing node is at a risk of privacy leakage.

Optionally, the description information related to the trusted random number includes a random number generation rule corresponding to the trusted random number; and the audit module is further configured to: verify, based on the random number generation rule that is recorded in the audit log and corresponds to the random number transmitted by the computing node participating in the secure multi-party computation, whether the random number matches the trusted random number from the trusted random source; and if it does, determine that the random number transmitted as the computing parameter by the computing node is at the risk of privacy leakage; or if it does not, determine that the random number transmitted as the computing parameter by the computing node is not at the risk of privacy leakage.

Optionally, to obtain a trusted random number from the trusted random source, the obtaining module is configured to: obtain a random number generated by the trusted random source as the trusted random number; obtain a random number generated by the trusted random source, and use a result obtained by further performing an operation on the random number generated by the trusted random source and a random number generated by the computing node as the trusted random number; obtain a random number generated by the trusted random source, and use a random number computed by inputting the random number generated by the trusted random source into a key generation function as the trusted random number; or obtain a random number generated by the trusted random source, and use a result obtained by further performing an operation on a random number computed by inputting the random number generated by the trusted random source into a key generation function and a random number generated by the computing node as the trusted random number.

This specification further provides an electronic device, including: a processor; and a memory configured to store machine-executable instructions, wherein, by reading and executing the machine-executable instructions stored in the memory and corresponding to control logic of secure multi-party computation, the processor is configured to: obtain a trusted random number from the trusted random source; perform an operation on held private data based on the obtained trusted random number to obtain an operation result; and transmit at least the trusted random number as a computing parameter to other computing nodes participating in the secure multi-party computation for the other computing nodes to perform the secure multi-party computation based on collected computing parameters transmitted by the computing nodes participating in the secure multi-party computation.

This specification further provides a secure multi-party computation method, applicable to one of a plurality of computing nodes deployed in a distributed network, the plurality of computing nodes jointly participating in the secure multi-party computation based on data held on each of the plurality of computing nodes, and the one of the plurality of computing nodes coupled to a trusted random source.

The method may comprise: obtaining, by the one of the plurality of computing nodes, a trusted random number from the trusted random source; performing, by the one of the plurality of computing nodes and based on the trusted random number, an operation on the data held by the one of the plurality of computing nodes to obtain an operation result; and transmitting, by the one of the plurality of computing nodes, a computing parameter comprising at least the trusted random number to the other computing nodes of the plurality computing nodes for the other computing nodes to perform the secure multi-party computation based on the computing parameter.

This specification further provides a secure multi-party computation apparatus, comprising a processor and a non-transitory computer-readable memory coupled to the processor, and configured with instructions executable by the processor to perform operations.

The operations may include: obtaining, by one of a plurality of computing nodes, a trusted random number from a trusted random source, wherein the plurality of computing nodes jointly participating in a secure multi-party computation based on data held on each of the plurality of computing nodes, and the one of the plurality of computing nodes coupled to the trusted random source; performing, by the one of the plurality of computing nodes and based on the trusted random number, an operation on the data held by the one of the plurality of computing nodes to obtain an operation result; and transmitting, by the one of the plurality of computing nodes, a computing parameter comprising at least the trusted random number to the other computing nodes of the plurality computing nodes for the other computing nodes to perform the secure multi-party computation based on the computing parameter.

This specification further provides a non-transitory computer-readable storage medium having instructions stored thereon executable by a processor to cause the processor to perform operations.

The operations may include: obtaining, by one of a plurality of computing nodes, a trusted random number from a trusted random source, wherein the plurality of computing nodes jointly participating in a secure multi-party computation based on data held on each of the plurality of computing nodes, and the one of the plurality of computing nodes coupled to the trusted random source; performing, by the one of the plurality of computing nodes and based on the trusted random number, an operation on the data held by the one of the plurality of computing nodes to obtain an operation result; and transmitting, by the one of the plurality of computing nodes, a computing parameter comprising at least the trusted random number to the other computing nodes of the plurality computing nodes for the other computing nodes to perform the secure multi-party computation based on the computing parameter.

According to the foregoing technical solution, the computing nodes participating in the secure multi-party computation may obtain a trusted random number from the connected trusted random source, perform an operation on the held private data based on the obtained trusted random number to obtain an operation result, and then transmit at least the trusted random number as a computing parameter to other computing nodes participating in the secure multi-party computation to perform the secure multi-party computation. In this way, the computing node may no longer use a random number generated locally by using a carried secure multi-party computation algorithm as a computing parameter, and use the trusted random number obtained from the connected trusted random source as the computing parameter instead, so that the risk of privacy leakage caused by constructing a pseudo-random number according to a malicious secure multi-party computation algorithm based on the held private data as a computing parameter can be avoided.

DETAIL DESCRIPTION OF THE EMBODIMENTS

Figure 1:
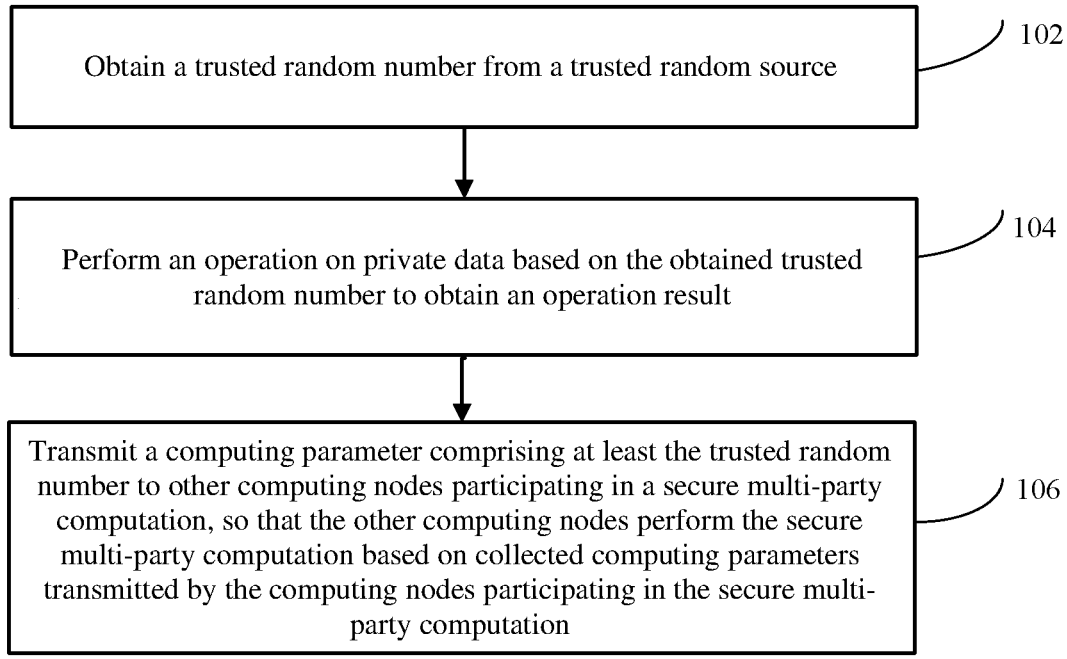
FIG. 1 is a flowchart of a secure multi-party computation method according to an embodiment.

For a computing node carrying secure multi-party computation algorithms such as a secret sharing algorithm and a garbled circuit algorithm, one or more random numbers may be generated based on carried randomized algorithms. The generated random number may be used to perform an operation on private data held by the computing node to obtain an operation result. Then, the generated random number and the foregoing operation result may be transmitted, as computing parameters, to other computing nodes participating in a secure multi-party computation.

However, in actual applications, a malicious secure multi-party algorithm may exploit the private data held by a computing node participating in the secure multi-party computation to construct a pseudo-random number. Then the pseudo-random number, along with an operation result obtained by performing an operation on the private data based on the pseudo-random number, may be transmitted to the other computing nodes participating in the secure multi-party computation. As a result, the other computing nodes may perform a backward recovery on the pseudo-random number to restore the original private data used to construct the pseudo-random number, leading to a breach of the private data.

For example, the private data may be inputted into a reversible random number generation function to obtain a pseudo-random number. A receiver of the pseudo-random number may use an inverse function of the random number generation function to perform inverse computation based on the pseudo-random number to restore the original private data used to construct the pseudo-random number.

In view of the aforementioned limitations, this specification provides a technical solution of using a trusted random number from a trusted random source as a computing parameter for secure multi-party computation, which prevents possible data breach caused by constructing a pseudo-random number as a computing parameter based on private data held by a computing node participating in the secure multi-party computation.

In actual implementations, computing nodes in a distributed network may each, in addition to carrying a secure multi-party computation algorithm provided by a provider, be further respectively connected to a trusted random source. The trusted random sources may be random sources independently developed by operators of the computing nodes or may be random sources developed by a trusted third party other than the foregoing provider.

When the computing node participates in secure multi-party computation based on its private data, the computing node may obtain a trusted random number from the connected trusted random source, and perform an operation on its private data based on the trusted random number to obtain an operation result. Then the computing node may transmit a computing parameter which includes at least the foregoing trusted random number (in some scenarios, the computing parameter may further include the foregoing operation result) to other computing nodes participating in the secure multi-party computation in the distributed network. Then the other computing nodes may perform secure multi-party computation based on collected computing parameters transmitted by the computing nodes participating in the secure multi-party computation.

According to the foregoing technical solution, the computing nodes participating in the secure multi-party computation may each obtain a trusted random number from the connected trusted random source, perform an operation on its private data based on the obtained trusted random number to obtain an operation result. Then the computing nodes may each transmit a parameter which includes at least the trusted random number to other computing nodes participating in the secure multi-party computation to perform the secure multi-party computation. In this way, the computing node may no longer need to use a random number generated locally by using a carried secure multi-party computation algorithm as a computing parameter. Instead, the computing node may use the trusted random number obtained from the connected trusted random source as the computing parameter, thereby preventing possible data breach caused by a malicious secure multi-party computation algorithm constructing a pseudo-random number based on the private data and using it as a computing parameter.

This specification is described below with reference to specific embodiments and specific application scenarios.

FIG. 1 shows a secure multi-party computation method according to an embodiment of this specification. The secure multi-party computation method is applicable to one of a plurality of computing nodes deployed in a distributed network. The plurality of computing may jointly participate in a secure multi-party computation based on private data respectively held on each of the plurality of computing nodes. The computing nodes deployed in the distributed network may each be respectively connected to a trusted random source. The secure multi-party computation method may include the following steps 102 through 106.

In step 102, one of the plurality of computing nodes may obtain a trusted random number from a trusted random source.

In step 104, the one of the plurality of computing nodes may perform an operation on the private data it held based on the obtained trusted random number to obtain an operation result.

In step 106, the one of the plurality of computing nodes may transmit computing parameters comprising at least the trusted random number to other computing nodes of the plurality of computing nodes participating in the secure multi-party computation for the other computing nodes to perform the secure multi-party computation based on collected computing parameters. The collected computing parameters may come from one or more other computing nodes participating in the secure multi-party computation.

The distributed network may include a data network in any form that can support secure multi-party computation and has a distributed architecture.

In one example, the distributed network may be a secure multi-party computation platform constructed by a device cluster (such as a server cluster) formed by a plurality of computing devices.

In another example, the distributed network may alternatively be a blockchain network formed by a plurality of node devices (i.e., computing nodes). An online service may be deployed on the blockchain network. The online service may require the plurality of node devices to jointly participate in a secure multi-party computation based on private data held by the plurality of node devices, and it needs to be ensured that the private data held by each node device is not disclosed to other node devices. A specific type of the online service is not specifically limited in this specification.

The computing node may specifically include a node device that can carry the secure multi-party computation algorithm in the distributed network.

The secure multi-party computation algorithm may include secure multi-party computation algorithms that are independently developed by the computing nodes or centrally provided by a provider. For example, in actual applications, the secure multi-party computation algorithm may correspond to secure multi-party computation software independently developed by the computing nodes or centrally provided by a provider.

The computing parameters may be generated by the computing nodes participating in the secure multi-party computation based on the carried secure multi-party computation algorithms and may be related to the private data held by the computing nodes. The computing nodes may need to transmit the computing parameters through an exchange message and mutual transmission between the computing nodes to perform secure multi-party computation based on collected computing parameters generated by the computing nodes.

In actual applications, the computing parameter may include random numbers and/or encrypted data needed to participate in secure multi-party computation.

It should be noted that, in actual applications, the foregoing secure multi-party computation algorithm may include, for example, a secret sharing algorithm, a homomorphic encryption algorithm or a garbled circuit algorithm. Specific content included in the computing parameters may depend on specific algorithm types of the secure multi-party computation algorithms carried by the computing nodes. The content of the computing parameters may be different for the node devices carrying the different algorithms listed above.

For example, for the secret sharing algorithm, the computing parameters may include N random numbers obtained by splitting the private data held by a computing node. The N random numbers may include N−1 independently generated random numbers, and the $N^{th}$ random number may be an operation result obtained by performing an operation on the N−1 random numbers and the private data held by the computing node.

For the homomorphic encryption algorithm, the computing parameters may include encrypted data obtained by encrypting the private data based on a key held by the computing node.

For the garbled circuit algorithm, the computing parameters may include random numbers used for respectively replacing an input value (i.e., input data participating in computation) and an output value of a garbled circuit (which may also be referred to as salt values of an input value and an output value), and encrypted data obtained by encrypting the salt value of output data using the salt value of the input value as a key.

The trusted random source may include random sources independently developed by operators of the computing nodes, or random sources provided by a trusted third party other than the foregoing provider. For example, in actual applications, the trusted random source may be a computer program (e.g., a trusted random number generation algorithm or a trusted random number generation function) independently developed by the operators of the computing nodes and used for generating a trusted random source, or may be a computer program developed by a trusted third party other than the provider and used for generating a trusted random source.

The operation result may include an operation result obtained by performing an irreversible operation on the trusted random number and the private data held by the computing node. The private data cannot be restored by performing an inverse operation on the operation result.

Using the secret sharing algorithm as an example, the operation result may be the $N^{th}$ random number obtained by performing an operation on the N−1 random numbers and the private data held by the computing node together.

Using the garbled circuit algorithm as another example, the operation result may be the encrypted data obtained by encrypting the salt value of the output data using the salt value of the input value of the garbled circuit as a key after the input value of the garbled circuit is replaced based on the trusted random number.

In this specification, a plurality of computing nodes may be deployed in a distributed network, as participants of the secure multi-party computation. The computing nodes may jointly carry the same type of secure multi-party computation algorithm to participate in secure multi-party computation without disclosing the respectively held private data.

For example, the computing nodes may jointly carry secure multi-party computation software provided by the provider of the secure multi-party computation algorithm and perform message exchange using the secure multi-party computation software to transmit encrypted data participating in the secure multi-party computation between the computing nodes to participate in secure multi-party computation.

It should be noted that, in this specification, the secure multi-party computation algorithm carried in the computing nodes may be an algorithm that supports transmission of the encrypted data obtained by encrypting the held private data based on a key as a computing parameter to other computing nodes participating in the secure multi-party computation. The secure multi-party computation algorithm may be, for example, a homomorphic encryption algorithm or a garbled circuit algorithm.

In addition to jointly carrying the same type of secure multi-party computation algorithm, a trusted random source, an independent data source, a result storage system, and a log storage system may further be separately deployed in the computing nodes deployed in the distributed network.

The trusted random source may be used for generating a trusted random number.

The data source may be used for storing and maintaining private data held by data nodes (i.e., computing nodes).

The result storage system may be used for storing and maintaining a final computation result obtained by participating in secure multi-party computation by the data nodes.

It should be noted that, in actual applications, alternatively, the trusted random source may be a random source provided by a trusted third party other than the provider of the secure multi-party computation algorithm. In this case, a trusted random source may not necessarily be deployed locally in the computing nodes. Instead, a third-party trusted random source may be directly connected to the computing nodes to obtain a trusted random source used for performing an operation on the private data held by the computing nodes.

In addition, in some secure multi-party computations that only involve a small amount of data, it may not be necessary to deploy an independent data source and result storage system in the node devices. In this case, the computing nodes may directly obtain data inputted by a user through an operation interface as the data source, and output a final computation result of the secure multi-party computation to the user through the operation interface.

The log storage system may be used for storing and maintaining audit logs created by the data nodes and related to the computing parameters.

It should be noted that, the created audit logs may be alternatively stored in a third-party storage device or storage system. In this case, it may not be necessary to deploy an independent log storage system locally in the computing nodes. That is, in actual applications, the computing node that generates an audit log and the computing node that stores the audit log may be the same or different, and this is not specifically limited in this specification.

For any target computing node participating in the secure multi-party computation, when jointly completing the secure multi-party computation with other computing nodes, the target computing node may first read private data that is needed to participate in the secure multi-party computation from deployed data sources, and obtain a trusted random number from the trusted random source.

The target computing node may then perform an operation on the private data based on the obtained trusted random number to generate an operation result corresponding to the private data.

In some embodiments, when obtaining a trusted key from a trusted key source, the target computing node may directly obtain a random number generated by the trusted key source as the trusted key. Alternatively, the target computing node may only obtain a root random number used for generating a random number from the trusted key source (i.e., a random number seed used for generating a random number), perform computation locally by inputting the root random number into a key generation function, and then use the computed random number as the trusted key.

In some embodiments, when obtaining a trusted key from a trusted key source, the target computing node may alternatively use a result obtained by performing an operation on a random number obtained from the trusted key source and a random number generated locally based on a carried key generation function as the trusted key. The target computing node may alternatively use a result obtained by further performing an operation on a random number generated by inputting a random number obtained from the trusted key source into a key generation function for computation and a random number generated locally based on a carried random number generation function (i.e., using a random number seed generated locally to compute a random number) as the trusted key.

An operation rule used for performing an operation on the received private data based on the obtained trusted random number may depend on a specific type of a secure multi-party computation algorithm carried by the node device. For different secure multi-party computation algorithms, operation rules used for performing an operation on the received private data based on the obtained trusted random number may be different.

For example, if the secure multi-party computation algorithm carried by the node device is the secret sharing algorithm, the operation rule may correspond to the process of obtaining the $N^{th}$ random number by performing an operation on the N−1 random numbers and the held private data together.

In another example, if the secure multi-party computation algorithm carried by the node device is the garbled circuit algorithm, the operation rule may correspond to the process of encrypting the salt value of the output data using the salt value corresponding to the input value of the garbled circuit as a key after the input value of the garbled circuit is replaced based on the trusted random number.

After the target computing node performs an operation on the received private data based on the obtained trusted random number to generate an operation result corresponding to the private data held by the target computing node, the target computing node may construct an exchange message based on the carried secure multi-party computation algorithm and an existing message exchange mechanism to transmit a computing parameter comprising at least the trusted random number to other computing nodes participating in secure multi-party computation.

It should be noted that, in actual applications, the trusted random number and the operation result may be transmitted together as computing parameters to the other computing nodes participating in secure multi-party computation.

In an example in which the secure multi-party computation algorithm carried in the computing node is the secret sharing algorithm, based on the secret sharing algorithm, the operation result may be an $N^{th}$ share obtained by splitting the private data. In this case, the computing node may choose to reserve the $N^{th}$ share locally, and transmit the remaining N−1 random numbers, as the computing parameters, to other computing nodes. Alternatively, the computing node may choose to reserve one of the N−1 random numbers locally, and transmit the $N^{th}$ random number and the remaining of the N−1 random numbers, as the computing parameters, to other computing nodes.

The other computing nodes may collect computing parameters transmitted, through the exchange message, by the computing nodes participating in the secure multi-party computation, perform the secure multi-party computation based on the collected computing parameters, and store the computation result in the result storage system deployed locally.

Correspondingly, the target computing node may alternatively collect computing parameters transmitted, through the exchange message, by the computing nodes participating in the secure multi-party computation, perform the secure multi-party computation based on the collected computing parameters, and store the computation result in the result storage system deployed locally.

It should be noted that a computation process of the secure multi-party computation performed by the computing nodes participating in the secure multi-party computation is based on the collected computing parameters and may depend on a specific algorithm type of the secure multi-party computation algorithm carried in the computing nodes. Generally, different types of secure multi-party computation algorithms may have different computation processes.

A description of the algorithm logic of various algorithms listed above is present below using examples in which the secure multi-party computation algorithms carried in the computing nodes are the secret sharing algorithm and the garbled circuit algorithm, respectively.

1. Secret Sharing Algorithm

The secret sharing algorithm is also referred to as a secret splitting algorithm. A basic principle of the secret sharing algorithm is to split a secret (e.g., a key) into a plurality of shares and deliver the shares to different people for storage. The secret can be restored only when the quantity of collected shares exceeds a threshold quantity. If the quantity of the collected shares is less than the threshold quantity, no information about the secret can be restored based on the shares. When the secret sharing algorithm is applied to secure multi-party computation, the threshold quantity is generally the same as a quantity of computing nodes needed to participate in the secure multi-party computation and be deployed in a distributed network.

When the secret sharing algorithm is applied to the secure multi-party computation, the computing nodes may respectively split input data into shares and exchange the shares with each other. The computing nodes then may respectively perform an operation on locally collected shares to obtain an aggregated share corresponding to a final computation result of the secure multi-party computation (i.e., one share of the final computation result). Eventually, the computing nodes merge all aggregated shares corresponding to the final computation result to obtain the final computation result, hereby completing the secure multi-party computation.

If the secure multi-party computation algorithm carried in the computing nodes deployed in the distributed network is the secret sharing algorithm, after the target computing node reads private data S that is needed to participate in the secure multi-party computation from a deployed data source, the target computing node may first split the private data into d shares (i.e., random numbers) according to the secret sharing algorithm.

Generally, according to existing computation logic of the secret sharing algorithm, d−1 independent random numbers may be generated, based on the secret sharing algorithm, in a preset random number value space P and in a random extraction manner as the first d−1 shares. These d−1 shares may be recorded as $S_1, S_2, S_3, \ldots, S_{d-1}$.

For example, if the private data S is integer data of 64 bits (i.e., $P=2^{64}$), and the d−1 independent random numbers generated may all be values extracted from a value space of $[0, 2^{64}-1]$.

In this specification, the first d−1 shares may not necessarily be generated according to the secret sharing algorithm. Instead, they may be generated by trusted random sources deployed locally in the computing nodes.

Further, the target computing node may obtain the first d−1 trusted random numbers from the trusted random sources, perform an operation on the first d−1 random numbers and the private data S together, and use an operation result obtained through the operation as a $d^{th}$ share, which is recorded as $S_d$.

An operation rule for performing an operation on the d−1 random numbers and the private data S together may depend on a specific secret sharing algorithm.

For example, using the trivial additive secret sharing algorithm, a common secret sharing algorithm, as an example, d shares obtained by splitting the private data may need to satisfy the following expression:

$$S=S_1+S_2+S_3+ \ldots +S_d \% P,$$

where % is the modulus operator.

Based on the foregoing expression, $S_d=S-(S_1+S_2+S_3+ \ldots +S_{d-1})\% P$. In this algorithm, $S_d$ may be obtained by subtracting a modulus computation result of a sum of the first d−1 shares and the value space P from the private data S.

After data splitting for the private data S is completed based on the secret sharing algorithm, the target computing node may reserve one share locally, construct an exchange message based on an existing message exchange mechanism, and transmit the remaining shares to other computing nodes participating in the secure multi-party computation respectively.

The target computing node may reserve the $N^{th}$ share, or any one of the first d−1 shares, locally. When the target computing node reserves the $N^{th}$ share locally, the computing parameters will include the random numbers used as the first d−1 shares. When the target computing node reserves any one of the first d−1 shares locally, the computing parameters will include the remaining random numbers used as the first d−1 shares and an operation result of the N−1 random numbers and the private data S.

According to one aspect, other computing nodes may collect shares transmitted by the computing nodes, perform computation on the collected shares according to operation logic stipulated by the computing nodes to obtain a share corresponding to the final computation result, and broadcast the computation result to the other computing nodes. The target computing node may collect the computation results broadcast by the other computing nodes, perform computation on the collected computation results again according to the stipulated operation logic to obtain a final computation result obtained by performing secure multi-party computation on the private data held by the computing nodes, and then store the final computation result in the result storage system deployed locally.

According to another aspect, the target computing node may alternatively collect the shares transmitted by the other computing nodes, perform computation on the collected shares according to the stipulated operation logic to obtain a share corresponding to the final computation result, and broadcast the computation result to the other computing nodes. The other computing nodes may collect the computation results broadcast by the computing nodes, and perform computation on the collected computation results again according to the stipulated operation logic to obtain a final result obtained by performing secure multi-party computation on the private data S held by the other computing nodes.

The operation logic stipulated by the computing nodes may depend on an actual secure multi-party computation requirement, and is not specifically limited in this specification.

2. Garbled Circuit Algorithm

A principle of the garbled circuit algorithm is to simulate an application-specific integrated circuit (ASIC) by using a computer to implement secure multi-party computation. Any secure multi-party computation task may be implemented by the ASIC designed for the task. That is, a gate circuit corresponding to the operation logic may be simulated by connecting a plurality of operation gates (e.g., basic operation gates such as AND gates and XOR gates) according to the operation logic corresponding to the secure multi-party computation task, and the gate circuit then may be used to perform an operation.

Based on the garbled circuit algorithm, the operation logic corresponding to the secure multi-party computation task may be represented as a gate circuit, each operation path of the gate circuit may then be encrypted, and the encrypted gate circuit may be referred to as a garbled circuit. Secure multi-party computation may be implemented by performing an operation of the garbled circuit using a computer.

When secure multi-party computation is implemented based on the garbled circuit algorithm, computing nodes participating in the secure multi-party computation may be classified into two roles, namely, a generation party of the garbled circuit and an execution party of the garbled circuit.

For example, in one secure multi-party computation with K participating computing nodes, K-1 computing nodes may be used as the generation party of a circuit to generate a garbled circuit, and one remaining computing node may be used as the execution party of the garbled circuit to perform an operation on the garbled circuit to obtain a final computation result.

If the secure multi-party computation algorithm carried in the computing nodes deployed in the distributed network is the garbled circuit algorithm, the operation logic corresponding to the secure multi-party computation task may first be represented as a gate circuit.

The operation logic requires that the plurality of computing nodes to jointly participate based on the private data respectively held in the computing nodes. One computing node may only correspond to one or several operation gates in the gate circuit, and the private data held by the computing node may only be used as input data of one or several operation gates in the gate circuit.

Further, after the target computing node reads the private data S that is needed to participate in secure multi-party computation from a deployed data source, the target computing node may use the received private data S as an input value of a corresponding operation gate in the gate circuit to perform an operation in the operation gate to obtain an output value of the operation gate.

In actual applications, the operation logic of each operation gate in the gate circuit may be represented and performed by using a truth table. One truth table may be used for recording an output value obtained by an output path when any value is inputted into an input path of the operation gate. Each row in the truth table may correspond to one input value combination of the input path. To hide true values of the operation paths in the operation gate in the operation of the gate circuit, according to one aspect, the target computing node may, based on existing operation logic of the garbled circuit algorithm, generate random numbers locally based on a random function carried in the garbled circuit algorithm, to replace the input values and the output values in the truth table of the operation gate. The random numbers obtained after the replacement may be referred to as salt values.

In this specification, the random numbers used for replacing the input values and the output values in the truth table of the operation gate may not necessarily be generated locally by the random function carried in the garbled circuit algorithm. Instead, they may be generated by a trusted random source deployed locally by the computing node.

In this case, the target computing node may obtain random numbers from the trusted random source, and replace the input values and the output values in the truth table based on the obtained random numbers.

According to another aspect, the target computing node may alternatively use the salt values corresponding to the input values of the operation gate as a key to perform asymmetric encryption on the salt values of the output values in the truth table of the operation gate to obtain encrypted data. The target computing node may replace the salt values of the output values in the original truth table based on the encrypted data to obtain a garbled truth table. Alternatively, the target computing node may independently create a garbled truth table based on the encrypted data (i.e., the garbled truth table only includes the encrypted data).

According to a third aspect, the target computing node may alternatively shuffle a sequence of each row in the garbled truth table.

Upon the completion of the garbled replacement for the truth table of the corresponding operation gate in the gate circuit by the target computing node in the foregoing three aspects, the garbled circuit is generated. The target computing node may construct an exchange message based on an existing message exchange mechanism of the garbled circuit. The target computing node may use the salt values corresponding to the input values of the corresponding operation gate in the gate circuit and the salt values corresponding to the input values of the operation gate as a key, and use the encrypted data obtained by performing asymmetric encryption on the salt values of the output values in the truth table of the operation gate as a computing parameter, to transmit the key and the computing parameter to the computing node serving as the execution party of the garbled circuit.

For example, in actual applications, when secure multi-party computation is implemented based on the garbled circuit algorithm, the garbled circuit algorithm and the oblivious transfer technology may be combined. When the target computing node transmits the computing parameter to the computing node serving as the execution party of the garbled circuit, on one hand, the target computing node may directly transmit the garbled truth table, in the form of clear text, to the computing node serving as the execution party of the garbled circuit. On the other hand, the oblivious transfer technology may be used to transmit, in a blurring transmission manner, the salt values corresponding to the input values of the operation gate corresponding to the target computing node in the gate circuit to the computing node serving as the execution party of the garbled circuit.

A specific implementation process of transmitting data to the computing node serving as the execution party of the garbled circuit based on the oblivious transfer technology will not be repeatedly described in detail in this specification. When a person skilled in the art implements the technical solution of this specification, reference may be made to the record in the related art.

After receiving the computing parameters transmitted by the computing nodes, the computing node serving as the execution party of the garbled circuit may perform decryption on the encrypted data recorded in the garbled truth table of the operation gates corresponding to the computing nodes in the gate circuit according to the salt values corresponding to the input values of the operation gates corresponding to the computing nodes in the gate circuit to obtain the salt values of the output values of the operation gates corresponding to the computing nodes in the gate circuit.

Eventually, the computing node serving as the execution party of the garbled circuit may perform an operation grade by grade based on the decrypted salt values of the output values of the operation gates in the gate circuit to obtain a salt value corresponding to a final output value of the gate circuit, and then transmit the salt value as the final computation result to other computing nodes.

After receiving the salt value corresponding to the final output value of the gate circuit, the target computing node may query the truth table to obtain an output value corresponding to the salt value based on a correspondence between a salt value and a true output value, and store the output value as an original value of a final computation result of the secure multi-party computation in the result storage system deployed locally.

For the computing nodes deployed in the distributed network, when the secure multi-party computation process shown above is completed, the computing nodes may perform visual output on the computation result stored in the result storage system to administrative users of the computing nodes.

In this specification, an exchange message carrying a large quantity of random numbers may be transmitted between computing nodes carrying secure multi-party computation algorithms such as the secret sharing algorithm and the garbled circuit algorithm. Even for a user of the secure multi-party computation algorithm, it is generally difficult to understand the specific meanings of the random numbers carried in the exchange message.

Based on this, in this specification, when a target node device transmits, by constructing an exchange message based on the existing message exchange mechanism of carried secure multi-party computation algorithm, the obtained trusted random number and the foregoing operation result as computing parameters to computing nodes participating in the secure multi-party computation, the target node device may further locally create an audit log related to the transmitted random number, and store the created audit log in a log storage system deployed locally.

The audit log may be specifically used for recording description information related to the random numbers transmitted by the computing nodes participating in the secure multi-party computation.

In some embodiments, the computing parameter that the computing node needs to transmit to other computing nodes participating in the secure multi-party computation may be included in a message field carried in the exchange message constructed by the computing node. Therefore, the specific meaning of each field and description information related to each field in the exchange message constructed by the computing node may be recorded in the audit log for auditing.

Correspondingly, when the target node device receives at least the random numbers transmitted as computing parameters by other computing nodes through the constructed exchanged message, the target node device may further create an audit log related to the random numbers transmitted by the other computing nodes, and store the created audit log in the log storage system deployed locally.

For example, the computing nodes deployed in the distributed network may carry the same secure multi-party computation algorithm, so that the exchange message constructed by the computing nodes may conform to the same message format. Therefore, after receiving the exchange message transmitted by other computing nodes, the target computing node may parse the exchange message according to a standard message format to generate a corresponding audit log, and record the specific meaning of each field in the exchange message in the audit log.

In this specification, the description information related to the random number and recorded in the audit log may cover any form of description information capable of proving that the random number is from the trusted random number of the trusted random source. This is not specifically limited in this specification.

In some embodiments, the description information related to the random number and recorded in the audit log may include a random number generation rule corresponding to the random number.

The random number generation rule may cover any form of description information related to a generation mode of the random number.

For example, the random number may be a trusted random number obtained from a trusted random source, a random number obtained by further performing an operation on a trusted random number obtained from a trusted random source and a random number generated locally, a random number generated by inputting a random number seed obtained from a trusted random source into a random number generation function, a random number generated by inputting a random number seed obtained from a trusted random source into a random number generation function, a random number obtained by further performing an operation on a random number generated locally or the like, which is not exhaustively listed in this specification.

In this specification, the computing nodes deployed in the distributed network may jointly use a secure multi-party algorithm provided by a provider of secure multi-party computation algorithms. Although the secure multi-party algorithm is an algorithm designed for protecting private data, an erroneous or malicious algorithm implementation may cause a breach of private data.

For example, in a scenario, a malicious secure multi-party computation algorithm may construct a pseudo-random number based on private data held by the computing node without a user's consent, and transmit the private data to other computing nodes by using the pseudo-random number.

In this specification, the computing nodes deployed in the distributed network may perform a privacy audit on the secure multi-party algorithm carried in the computing nodes based on the description information related to the random number and recorded in the audit log stored in the log storage system (or may only perform a privacy audit on the secure multi-party algorithm carried in this node or the secure multi-party algorithm carried in a specified computing node in the computing nodes) to determine whether the random numbers transmitted by the computing nodes contain a risk of data breach for the private data (i.e., whether the random numbers are at the risk to cause a leakage of the private data).

In actual applications, the privacy audit on the secure multi-party algorithm carried in the computing nodes may be alternatively performed by a third-party audit node. In this case, the computing nodes deployed in the distributed network may transmit the audit log in the log storage system to the audit node (for example, the computing node may actively transmit the audit log to the audit node, or the audit node may actively retrieve the audit log from the computing node), and the third-party audit node may perform a privacy audit on the secure multi-party algorithm carried in the computing nodes based on the received audit log to determine whether the computing parameters transmitted by the computing nodes contain a risk of data breach of the private data.

In one example, the computing nodes may carry a secure multi-party computation algorithm provided by the provider, and audit nodes may be independently deployed by operators of the computing nodes. The audit nodes may be used for performing a privacy audit on the secure multi-party computation algorithm provided by the provider.

The audit logic of performing a privacy audit on the secure multi-party algorithm carried in the computing nodes may depend on specific content of the description information related to the random number and recorded in the audit log.

In some embodiments, the description information related to the encrypted data and recorded in the audit log may include a random number generation rule corresponding to the encrypted data.

In some embodiments, the computing node may read an audit log corresponding to a random number transmitted as a computing parameter by the computing node participating in secure multi-party computation from a log storage system deployed locally, and check, based on a random number generation rule that is recorded in the audit log been read and corresponds to the random number, whether the random number is a trusted random number from the trusted random source.

A specific check rule may fully correspond to the random number generation rule.

In some embodiments, if the random number generation rule is a trusted random number obtained from a trusted random source, because when a trusted key source generates a random number as a trusted key, a random number may be extracted as a trusted key from a preset random number value space in a random extraction manner, the check rule may include: determining whether the value of the random number is within a value range of the random number value space, if it does, it indicates that the random number is a random number extracted from the value range of the random number value space, and the random number is a trusted key from a trusted key source in this case. Otherwise, it indicates that the random number is not a random number extracted from the value range of the random number value space, and the random number may not be a trusted key from a trusted key source in this case.

Correspondingly, in some embodiments, if the random number generation rule is generating a random number by inputting a random number seed obtained from a trusted random source into a random number generation function, the check rule may include: checking whether the random number seed is from a valid data source of a trusted random source.

If it is determined through the check that the random number is a trusted random number from a trusted random source or a data source generating the random number is a valid data source from trusted random sources, the random number used as a computing parameter is determined not containing a privacy risk (i.e., not having the risk of causing a breach of the private data). Otherwise, if it is determined through the check that the random number is not a trusted random number from a trusted random source, or the data source generating the random number is not a valid data source from trusted random sources, the random number may be a pseudo-random number constructed based on the private data held by the computing node in this case, and the random number as a computing parameter is determined containing a privacy risk (i.e., having a risk of causing a breach of the private data).

In this way, the computing node can determine whether the random number used as a computing parameter is a trusted random number from a trusted random source by performing a simple audit on the audit log in the log storage system deployed locally, so that the risk of data breach can be timely identified.

According to the foregoing technical solution, the computing nodes participating in the secure multi-party computation may obtain a trusted random number from the connected trusted random source, perform an operation on the held private data based on the obtained trusted random number to obtain an operation result, and then transmit at least the trusted random number and the operation result as computing parameters to other computing nodes participating in the secure multi-party computation to perform the secure multi-party computation. In this way, it is not necessary for the computing node to use a random number generated locally using a carried secure multi-party computation algorithm as a computing parameter. Instead, the computing node may use the trusted random number obtained from the connected trusted random source as the computing parameter, so that the risk of data breach caused by constructing a pseudo-random number according to a malicious secure multi-party computation algorithm based on the private data held by the computing node as a computing parameter can be prevented.

Figure 2:
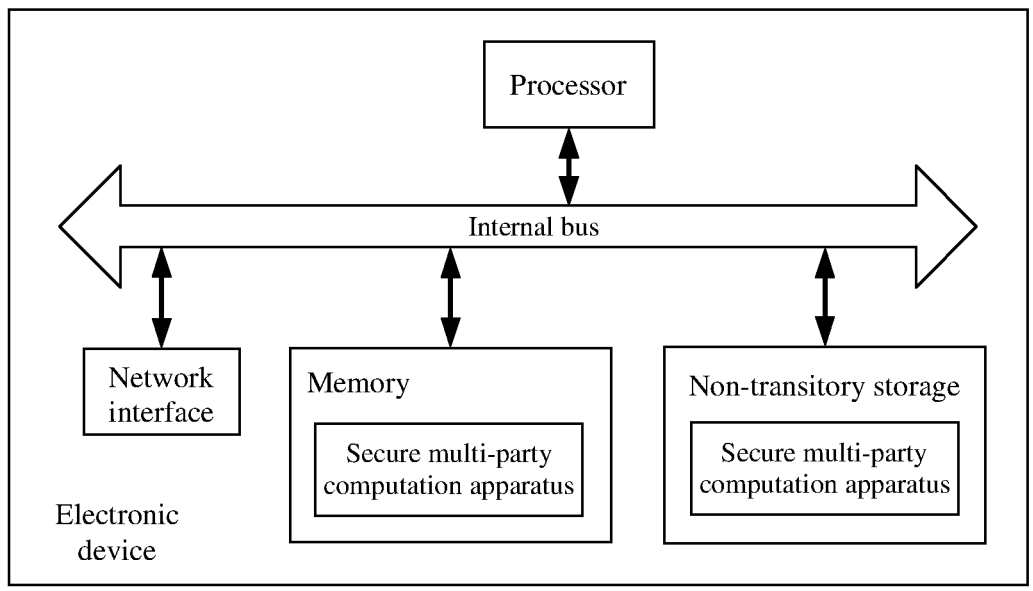
FIG. 2 is a schematic structural diagram of an electronic device according to an embodiment.

Corresponding to the foregoing method embodiment, this specification further provides a secure multi-party computation apparatus. The embodiment of the secure multi-party computation apparatus in this specification may be applied to an electronic device. The apparatus embodiment may be implemented by software, or by hardware or a combination of software and hardware. Using a software implementation as an example, as a logical apparatus, the apparatus may be formed by reading corresponding computer program instructions from a non-transitory storage into a memory by a processor of an electronic device where the apparatus is located. On a hardware level, as shown in FIG. 2, which is a hardware structural diagram of an electronic device in which a secure multi-party computation apparatus according to this specification is located, the electronic device in which the apparatus is located in the embodiment not only may include a processor, a memory, a network interface, and a non-transitory storage shown in FIG. 2, but may also include other hardware according to actual functions of the electronic device. Details are not described herein again.

Figure 3:
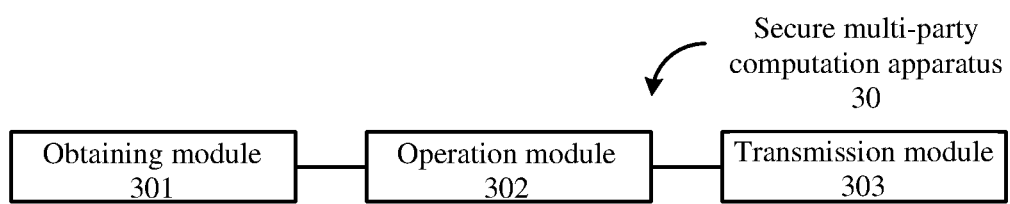
FIG. 3 is a block diagram of a secure multi-party computation apparatus according to an embodiment.

FIG. 3 is a block diagram of a secure multi-party computation apparatus according to an embodiment of this specification.

Referring to FIG. 3, the secure multi-party computation apparatus 30 may be applied to the electronic device shown in FIG. 1, and includes an obtaining module 301, an operation module 302, and a transmission module 303.

The obtaining module 301 may be configured to obtain a trusted random number from a trusted random source.

The operation module 302 may be configured to perform an operation on private data based on the obtained trusted random number to obtain an operation result.

The transmission module 303 may be configured to transmit a computing parameter comprising at least the trusted random number to other computing nodes participating in the secure multi-party computation for the other computing nodes to perform the secure multi-party computation based on collected computing parameters transmitted by the computing nodes participating in the secure multi-party computation.

In this embodiment, the apparatus 30 may further include a creation module 304 (not shown in FIG. 3).

The creation module 304 may be configured to create an audit log corresponding to the trusted random number transmitted by the computing node to the other computing nodes. The audit log may record description information related to the trusted random number.

In this embodiment, the apparatus 30 may further include a collection module 305 (not shown in FIG. 3).

The collection module 305 may be configured to collect computing parameters transmitted by the other computing nodes participating in the secure multi-party computation, the computing parameters comprising at least random numbers transmitted by the other computing nodes; perform the secure multi-party computation based on the collected computing parameters; and create an audit log corresponding to the random numbers transmitted by the other computing nodes. The audit log may include description information related to the random numbers.

In this embodiment, the apparatus 30 may further includes an audit module 306 (not shown in FIG. 3).

The audit module 306 may be configured to perform, based on the audit log, a privacy audit on the random number transmitted as a computing parameter by the computing node participating in the secure multi-party computation, to determine whether the random number transmitted as a computing parameter by the computing node contain a privacy risk (i.e., whether the random number may cause a data breach to the private data).

Alternatively, the audit module 306 may be configured to transmit the audit log to a third-party audit node for the audit node to perform a privacy audit on the random number transmitted as a computing parameter by the computing node participating in the secure multi-party computation, to determine whether the random number transmitted as a computing parameter by the computing node contain a privacy risk.

In this embodiment, the description information related to the trusted random number may include a random number generation rule corresponding to the trusted random number.

The audit module 306 may be further configured to: verify, based on the random number generation rule that is recorded in the audit log and corresponds to the random number transmitted by the computing node participating in the secure multi-party computation, whether the random number matches the trusted random number from the trusted random source.

If it matches, the audit module 306 may determine that the random number transmitted as a computing parameter by the computing node does not contain a privacy risk.

If it does not match, the audit module 306 may determine that the random number transmitted as a computing parameter by the computing node contains a privacy risk.

In this embodiment, a trusted random number may be obtained from the trusted random source in any one of the following manners.

The trusted random number may be obtained by obtaining a random number generated by the trusted random source, and using the random number as the trusted random number.

The trusted random number may also be obtained by obtaining a random number generated by the trusted random source, obtaining a computational result by performing an operation on the random number and a computational random number generated by the computing node, and using the computational result as the trusted random number.

The trusted random number may also be obtained by obtaining a random number generated by the trusted random source, obtaining a functional result by inputting the random number into a key generation function, and using the functional result as the trusted random number The trusted random number may also be obtained by obtaining a random number generated by the trusted random source, obtaining a functional result by inputting the random number into a key generation function, obtaining a computational result by performing an operation on the functional result and a computational random number generated by the computing node, and using the computational result as the trusted random number.

The implementation processes of the corresponding steps in the foregoing method may be referred to for details about the implementation processes of the functions and effects of the modules in the foregoing apparatus, details of which will not be repeated herein.

The apparatus embodiment may correspond to the method embodiment, and therefore partial or all descriptions in the method embodiments may be referred to for related parts. The described apparatus embodiment may be an example. The modules described as separate parts may or may not be physically separate, and parts displayed as modules may or may not be physical modules, may be located in one position, or may be distributed on a plurality of network modules. A part or all of the modules may be selected according to actual requirements to achieve the objectives of the solutions of this specification. A person of ordinary skill in the art may understand and implement the solutions without creative efforts.

The system, apparatus, module, or unit described in the foregoing embodiment may be specifically implemented by a computer chip or entity, or a product with a specified function. A typical implementation device is a computer, and a specific form of the computer may be a personal computer, a laptop computer, a cellular phone, a camera phone, a smartphone, a personal digital assistant, a media player, a navigation device, an email device, a game console, a tablet computer, a wearable device, or a combination of any of these devices.

Corresponding to the foregoing method embodiments, this specification further provides an electronic device. The electronic device may include a processor and a memory configured to store machine-executable instructions. The processor and the memory may be connected by an internal bus. In some embodiments, the device may further include an external interface for communication with other devices or components.

In some embodiments, by reading and executing the machine-executable instructions stored in the memory and corresponding to control logic of secure multi-party computation, the processor may be configured to: obtain a trusted random number from a trusted random source; perform an operation on private data held by a computing node participating in the secure multi-party computation based on the obtained trusted random number to obtain an operation result; and transmit a computing parameter comprising at least the trusted random number to other computing nodes participating in the secure multi-party computation for the other computing nodes to perform the secure multi-party computation based on collected computing parameters transmitted by the computing nodes participating in the secure multi-party computation.

In some embodiments, by reading and executing the machine-executable instructions stored in the memory and corresponding to control logic of secure multi-party computation, the processor may be configured to: create an audit log corresponding to the trusted random number transmitted by the computing node to the other computing nodes. The audit log may include description information related to the trusted random number.

In some embodiments, by reading and executing the machine-executable instructions stored in the memory and corresponding to control logic of secure multi-party computation, the processor may be configured to: collect computing parameters transmitted by the other computing nodes participating in the secure multi-party computation, the computing parameters at least including random numbers transmitted by the other computing nodes; perform the secure multi-party computation based on the collected computing parameters; and create an audit log corresponding to the random numbers transmitted by the other computing nodes and store the audit log. The audit log may include description information related to the random numbers.

In some embodiments, by reading and executing the machine-executable instructions stored in the memory and corresponding to control logic of secure multi-party computation, the processor may be configured to: perform, based on the audit log, a privacy audit on the random number transmitted as a computing parameter by the computing node participating in the secure multi-party computation, to determine whether the random number transmitted as a computing parameter by the computing node is at a risk of data breach; or transmit the audit log to a third-party audit node for the audit node to perform a privacy audit on the random number transmitted as a computing parameter by the computing node participating in the secure multi-party computation, to determine whether the random number transmitted as a computing parameter by the computing node is at a risk of data breach.

In some embodiments, the description information related to the trusted random number may include a random number generation rule corresponding to the trusted random number.

In some embodiments, by reading and executing the machine-executable instructions stored in the memory and corresponding to control logic of secure multi-party computation, the processor may be configured to: verify, based on the random number generation rule that is recorded in the audit log and corresponds to the random number transmitted by the computing node participating in the secure multi-party computation, whether the random number matches the trusted random number from the trusted random source; and if it matches, determine that the random number transmitted as a computing parameter by the computing node is at the risk of data breach; or, if it does not match, determine that the random number transmitted as a computing parameter by the computing node is not at the risk of data breach.

Corresponding to the foregoing method embodiments, this specification further provides a non-transitory computer-readable storage medium having instructions stored thereon executable by a processor to cause the processor to perform operations. The operations may be any one of the aforementioned secure-multi-party computation methods.

Other embodiments of this specification will be apparent to those skilled in the art from consideration of the specification and practice of the present application disclosed here. This specification is intended to cover any variations, uses, or adaptations of this specification following the general principles thereof and including such departures from this specification as come within known or customary practice in the art. It is intended that the specification and examples be considered as exemplary only, with a true scope and spirit of this specification being indicated by the following claims.

It will be appreciated that this specification is not limited to the exact construction that has been described above and illustrated in the accompanying drawings, and that various modifications and changes can be made without departing from the scope thereof. It is intended that the scope of this specification only be limited by the appended claims.

The foregoing descriptions are merely exemplary embodiments of this specification, but are not intended to limit this specification. Any modification, equivalent replacement, or improvement made without departing from the spirit and principle of this specification should fall within the protection scope of this specification.

What is claimed is:

1. A secure multi-party computation method, applicable to one of a plurality of computing nodes deployed in a distributed network, the plurality of computing nodes jointly participating in the secure multi-party computation based on data held on each of the plurality of computing nodes, and the one of the plurality of computing nodes coupled to a trusted random source, the method comprising:
   obtaining, by the one of the plurality of computing nodes, a trusted random number from the trusted random source;
   performing, by the one of the plurality of computing nodes and based on the trusted random number, an operation on the data held by the one of the plurality of computing nodes to obtain an operation result;
   transmitting, by the one of the plurality of computing nodes, a computing parameter comprising at least the trusted random number to the other computing nodes of the plurality computing nodes for the other computing nodes to perform the secure multi-party computation based on the computing parameter; and
   creating, by the one of the plurality of computing nodes, an audit log corresponding to the trusted random number, the audit log comprising description information related to the trusted random number,
   wherein obtaining the trusted random number from the trusted random source comprises any one of the following:
      obtaining a random number generated by the trusted random source, and using the random number as the trusted random number;
      obtaining an initial random number generated by the trusted random source, obtaining a computational result by performing an operation on the initial random number and a computational random number generated by the one of the plurality computing nodes, and using the computational result as the trusted random number;

obtaining an initial random number generated by the trusted random source, obtaining a functional result by inputting the initial random number into a key generation function, and using the functional result as the trusted random number; and obtaining an initial random number generated by the trusted random source, obtaining a functional result by inputting the initial random number into a key generation function, obtaining a computational result by performing an operation on the functional result and a computational random number generated by the one of the plurality of computing nodes, and using the computational result as the trusted random number.

2. The method of claim 1, further comprising:

collecting, by the one of the plurality of computing nodes, computing parameters transmitted by the other computing nodes participating in the secure multi-party computation, the computing parameters comprising at least random numbers transmitted by the other computing nodes;

performing, by the one of the plurality of computing nodes, the secure multi-party computation based on the computing parameters transmitted by the other computing nodes; and creating an audit log corresponding to the random numbers transmitted by the other computing nodes and comprising description information related to the random numbers transmitted by the other computing nodes.

3. The method of claim 2, further comprising:

performing, based on the audit log corresponding to the random numbers transmitted by the other computing nodes, a privacy audit on the random numbers comprised in the computing parameters transmitted by the other computing nodes participating in the secure multi-party computation to determine whether the random numbers transmitted by other computing nodes contain a privacy risk; or transmitting the audit log corresponding to the random numbers transmitted by the other computing nodes to a third-party audit node for the audit node to perform a privacy audit on the random numbers comprised in the computing parameters transmitted by the other computing nodes participating in the secure multi-party computation to determine whether the random numbers transmitted by other computing nodes contain a privacy risk.

4. The method of claim 3, wherein the description information related to the random number comprises a random number generation rule corresponding to the random number, and wherein the performing a privacy audit on the random numbers comprised in the computing parameters transmitted by the other computing nodes participating in the secure multi-party computation to determine whether the random numbers transmitted by other computing nodes contain a privacy risk comprises:

determining, based on the random number generation rule in the audit log and corresponding to the random numbers transmitted by the other computing nodes participating in the secure multi-party computation, whether the random numbers match a random number from the trusted random source; and determining, in response to the random numbers comprised in the computer parameters transmitted by the other computing nodes matching the random number from the trusted random source, the random numbers comprised in the computing parameters transmitted by the other computing nodes does not contain a privacy risk; or determining, in response to the random numbers comprised in the computer parameters transmitted by the other computing nodes not matching the random number from the trusted random source, the random numbers comprised in the computing parameters transmitted by the other computing nodes contain a privacy risk.

5. The method of claim 2, wherein the other computing nodes are each coupled to a trusted random source, and the random numbers transmitted by the other computing nodes are obtained from the trusted random sources coupled to the other computing nodes.

6. The method of claim 1, wherein the distributed network is a blockchain network, and the plurality of computing nodes are node devices in the blockchain network.

7. The method of claim 1, wherein the computing parameter further comprises encrypted data for participating the secure multi-party computation, wherein the encrypted data is generated based on the data held by the one of the plurality of computing nodes.

8. A secure multi-party computation apparatus, comprising a processor and a non-transitory computer-readable memory coupled to the processor, and configured with instructions executable by the processor to perform operations, comprising:

obtaining, by one of a plurality of computing nodes, a trusted random number from a trusted random source, wherein the plurality of computing nodes jointly participating in a secure multi-party computation based on data held on each of the plurality of computing nodes, and the one of the plurality of computing nodes coupled to the trusted random source;

performing, by the one of the plurality of computing nodes and based on the trusted random number, an operation on the data held by the one of the plurality of computing nodes to obtain an operation result;

transmitting, by the one of the plurality of computing nodes, a computing parameter comprising at least the trusted random number to the other computing nodes of the plurality computing nodes for the other computing nodes to perform the secure multi-party computation based on the computing parameter; and creating, by the one of the plurality of computing nodes, an audit log corresponding to the trusted random number, the audit log comprising description information related to the trusted random number, wherein obtaining the trusted random number from the trusted random source comprises any one of the following:

obtaining a random number generated by the trusted random source, and using the random number as the trusted random number;

obtaining an initial random number generated by the trusted random source, obtaining a computational result by performing an operation on the initial random number and a computational random number generated by the one of the plurality computing nodes, and using the computational result as the trusted random number;
obtaining an initial random number generated by the trusted random source, obtaining a functional result by inputting the initial random number into a key generation function, and using the functional result as the trusted random number; and
obtaining an initial random number generated by the trusted random source, obtaining a functional result by inputting the initial random number into a key generation function, obtaining a computational result by performing an operation on the functional result and a computational random number generated by the one of the plurality of computing nodes, and using the computational result as the trusted random number.

9. The apparatus of claim 8, wherein the operations further comprise:
collecting, by the one of the plurality of computing nodes, computing parameters transmitted by the other computing nodes participating in the secure multi-party computation, the computing parameters comprising at least random numbers transmitted by the other computing nodes;
performing, by the one of the plurality of computing nodes, the secure multi-party computation based on the computing parameters transmitted by the other computing nodes; and
creating an audit log corresponding to the random numbers transmitted by the other computing nodes and comprising description information related to the random numbers transmitted by the other computing nodes.

10. The apparatus of claim 9, wherein the operations further comprise:
performing, based on the audit log corresponding to the random numbers transmitted by the other computing nodes, a privacy audit on the random numbers comprised in the computing parameters transmitted by the other computing nodes participating in the secure multi-party computation to determine whether the random numbers transmitted by other computing nodes contain a privacy risk; or
transmitting the audit log corresponding to the random numbers transmitted by the other computing nodes to a third-party audit node for the audit node to perform a privacy audit on the random numbers comprised in the computing parameters transmitted by the other computing nodes participating in the secure multi-party computation to determine whether the random numbers transmitted by other computing nodes contain a privacy risk.

11. The apparatus of claim 10, wherein the description information related to the random number comprises a random number generation rule corresponding to the random number, and
wherein the performing a privacy audit on the random numbers comprised in the computing parameters transmitted by the other computing nodes participating in the secure multi-party computation to determine whether the random numbers transmitted by other computing nodes contain a privacy risk comprises:
determining, based on the random number generation rule in the audit log and corresponding to the random numbers transmitted by the other computing nodes participating in the secure multi-party computation, whether the random numbers match a random number from the trusted random source; and
determining, in response to the random numbers comprised in the computer parameters transmitted by the other computing nodes matching the random number from the trusted random source, the random numbers comprised in the computing parameters transmitted by the other computing nodes does not contain a privacy risk; or
determining, in response to the random numbers comprised in the computer parameters transmitted by the other computing nodes not matching the random number from the trusted random source, the random numbers comprised in the computing parameters transmitted by the other computing nodes contain a privacy risk.

12. The apparatus of claim 9, wherein the other computing nodes are each coupled to a trusted random source, and the random numbers transmitted by the other computing nodes are obtained from the trusted random sources coupled to the other computing nodes.

13. The apparatus of claim 8, wherein the distributed network is a blockchain network, and the plurality of computing nodes are node devices in the blockchain network.

14. The apparatus of claim 8, wherein the computing parameter further comprises encrypted data for participating the secure multi-party computation, wherein the encrypted data is generated based on the data held by the one of the plurality of computing nodes.

15. A non-transitory computer-readable storage medium having instructions stored thereon executable by a processor to cause the processor to perform operations comprising:
obtaining, by one of a plurality of computing nodes, a trusted random number from a trusted random source, wherein the plurality of computing nodes jointly participating in a secure multi-party computation based on data held on each of the plurality of computing nodes, and the one of the plurality of computing nodes coupled to the trusted random source;
performing, by the one of the plurality of computing nodes and based on the trusted random number, an operation on the data held by the one of the plurality of computing nodes to obtain an operation result;
transmitting, by the one of the plurality of computing nodes, a computing parameter comprising at least the trusted random number to the other computing nodes of the plurality computing nodes for the other computing nodes to perform the secure multi-party computation based on the computing parameter; and
creating, by the one of the plurality of computing nodes, an audit log corresponding to the trusted random number, the audit log comprising description information related to the trusted random number,
wherein obtaining the trusted random number from the trusted random source comprises any one of the following:
obtaining a random number generated by the trusted random source, and using the random number as the trusted random number;
obtaining an initial random number generated by the trusted random source, obtaining a computational result by performing an operation on the initial random number and a computational random number generated by the one of the plurality computing nodes, and using the computational result as the trusted random number;

obtaining an initial random number generated by the trusted random source, obtaining a functional result by inputting the initial random number into a key generation function, and using the functional result as the trusted random number; and obtaining an initial random number generated by the trusted random source, obtaining a functional result by inputting the initial random number into a key generation function, obtaining a computational result by performing an operation on the functional result and a computational random number generated by the one of the plurality of computing nodes, and using the computational result as the trusted random number.

* * * * *